Patented Mar. 28, 1939

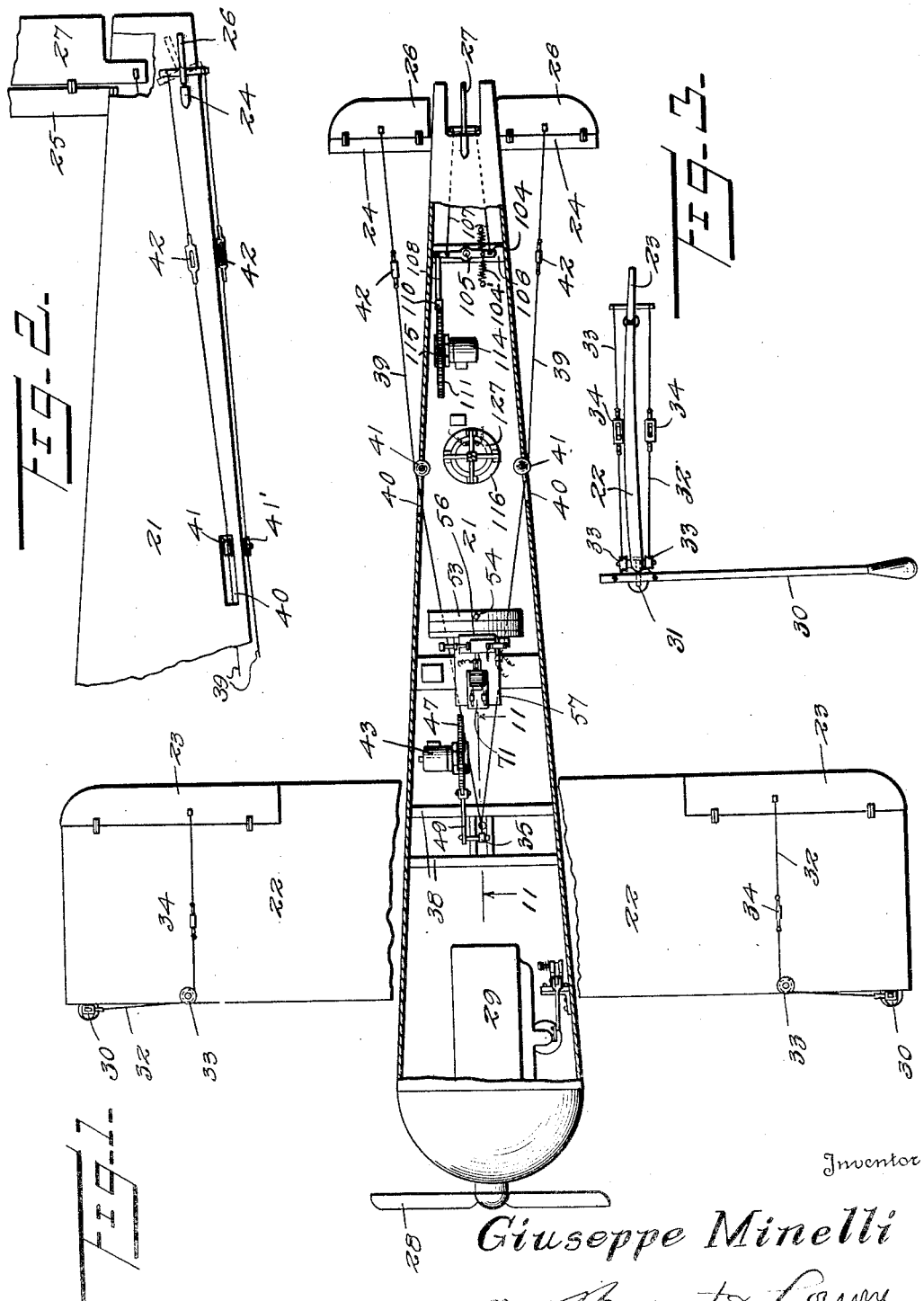

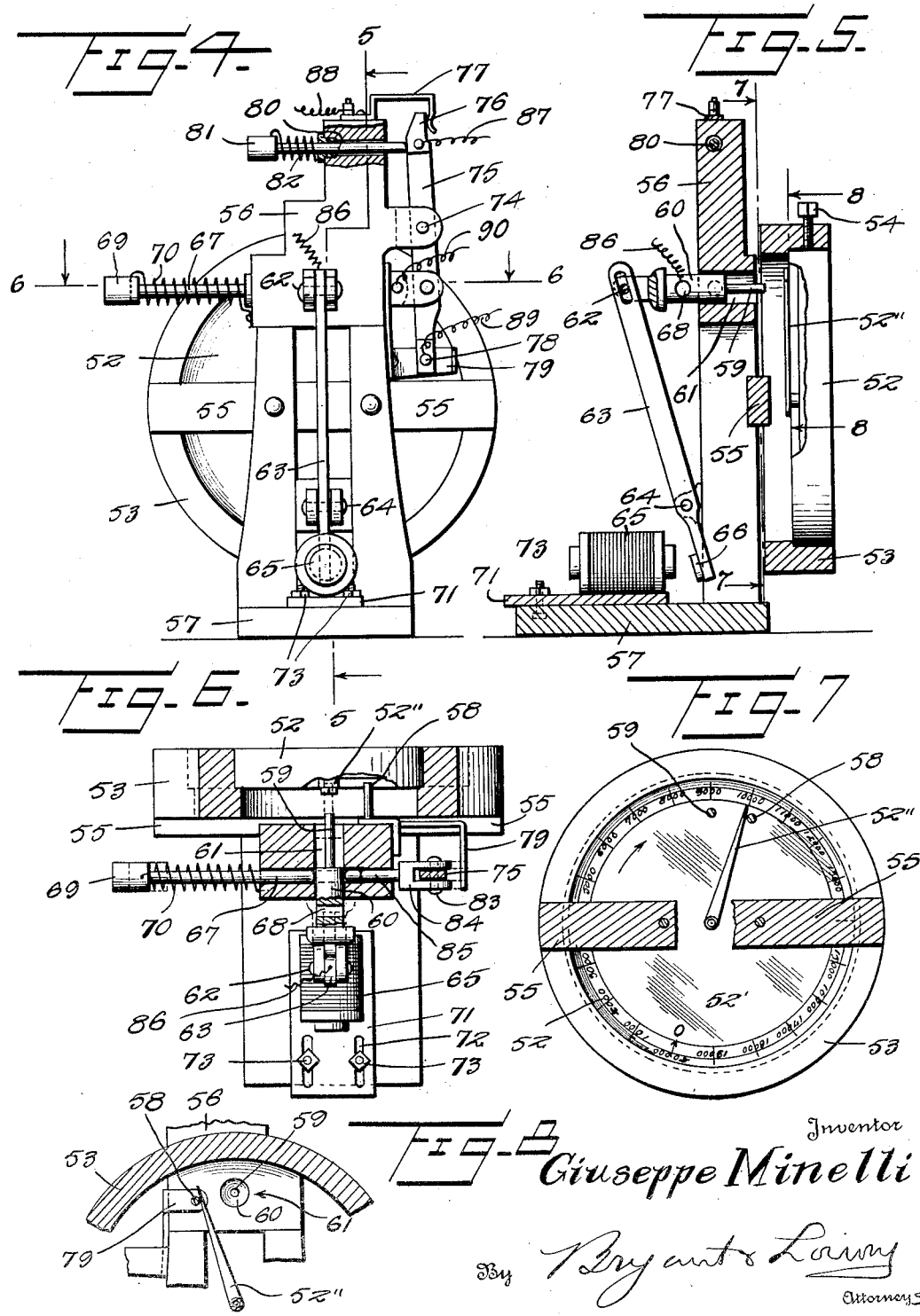

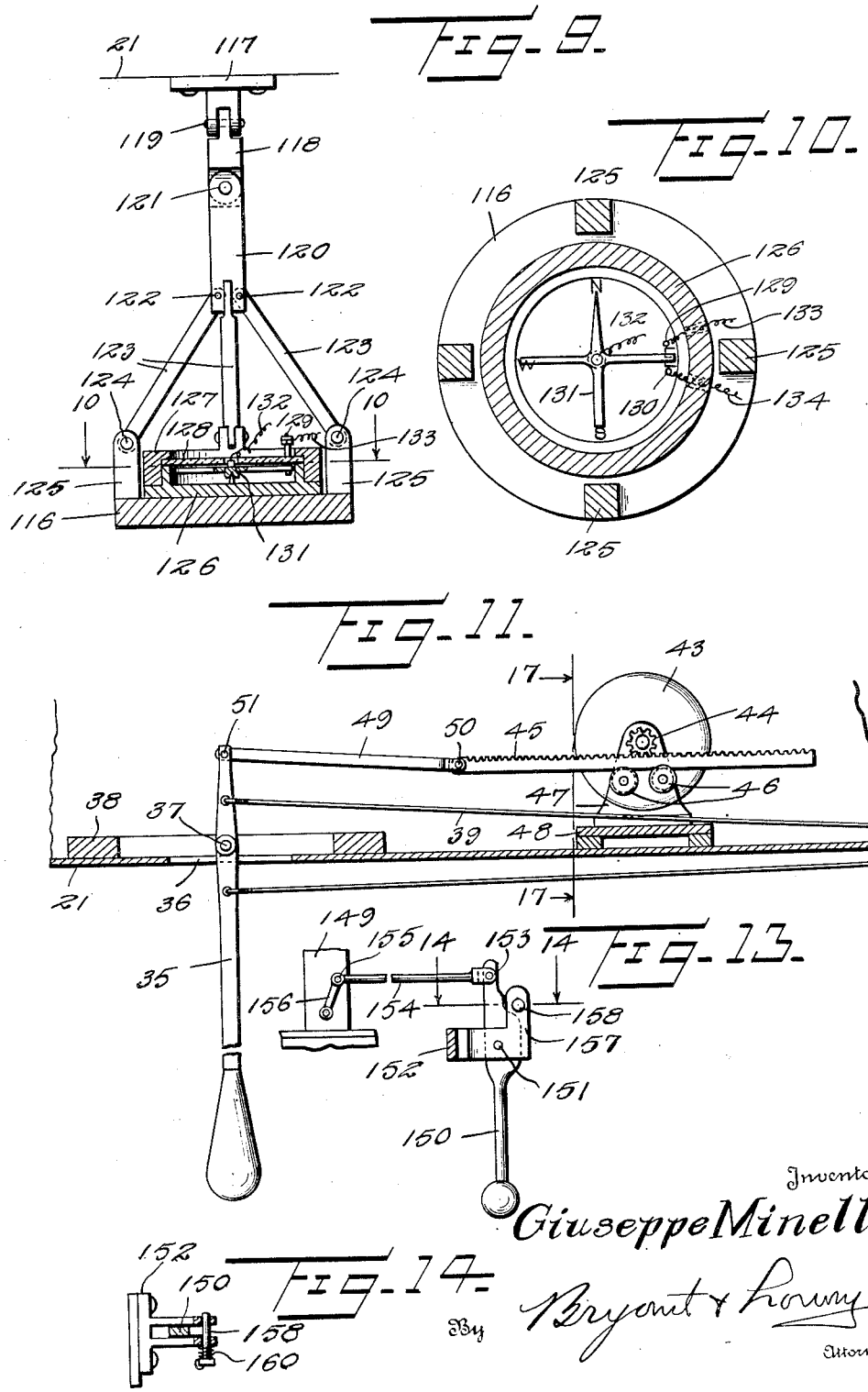

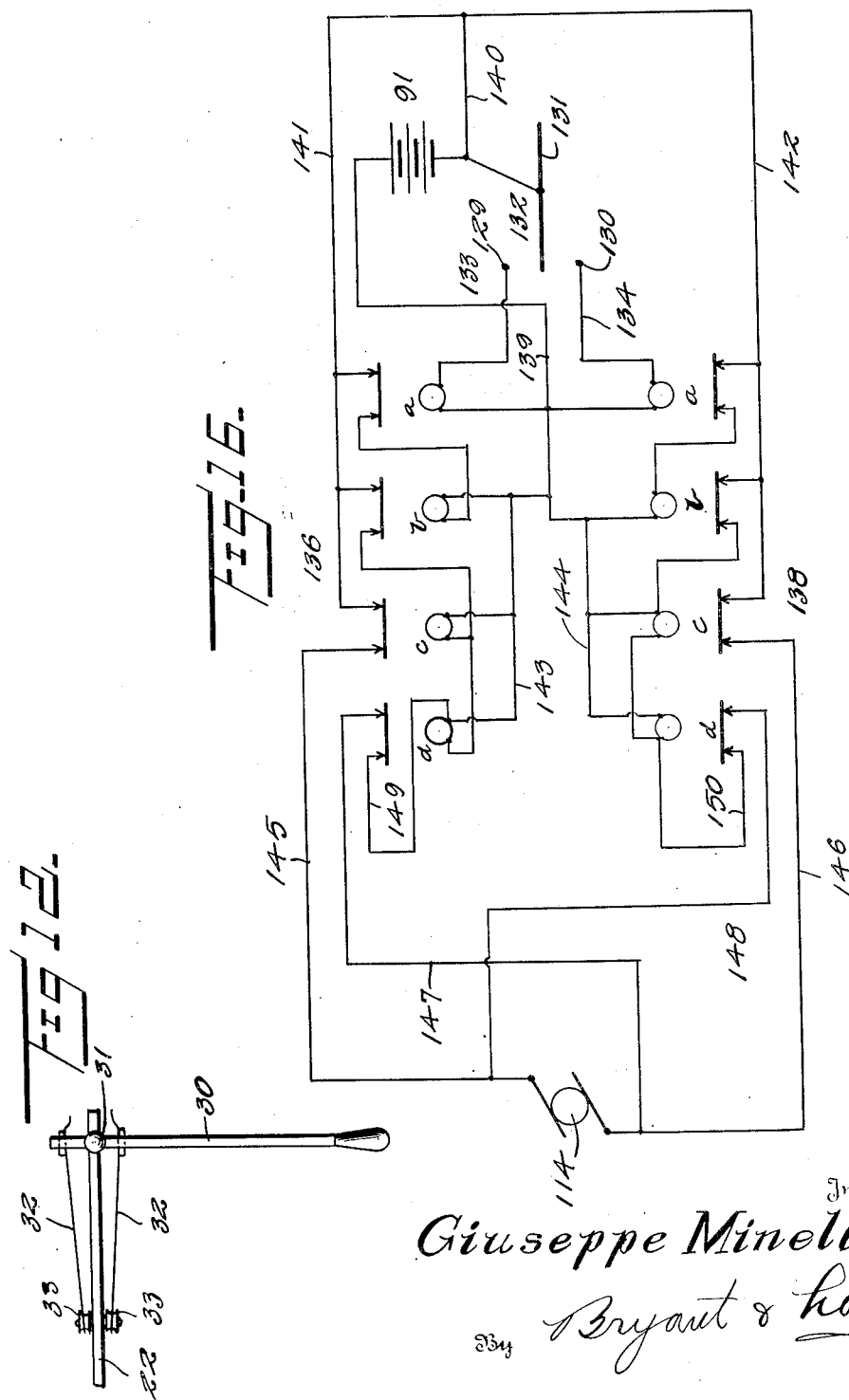

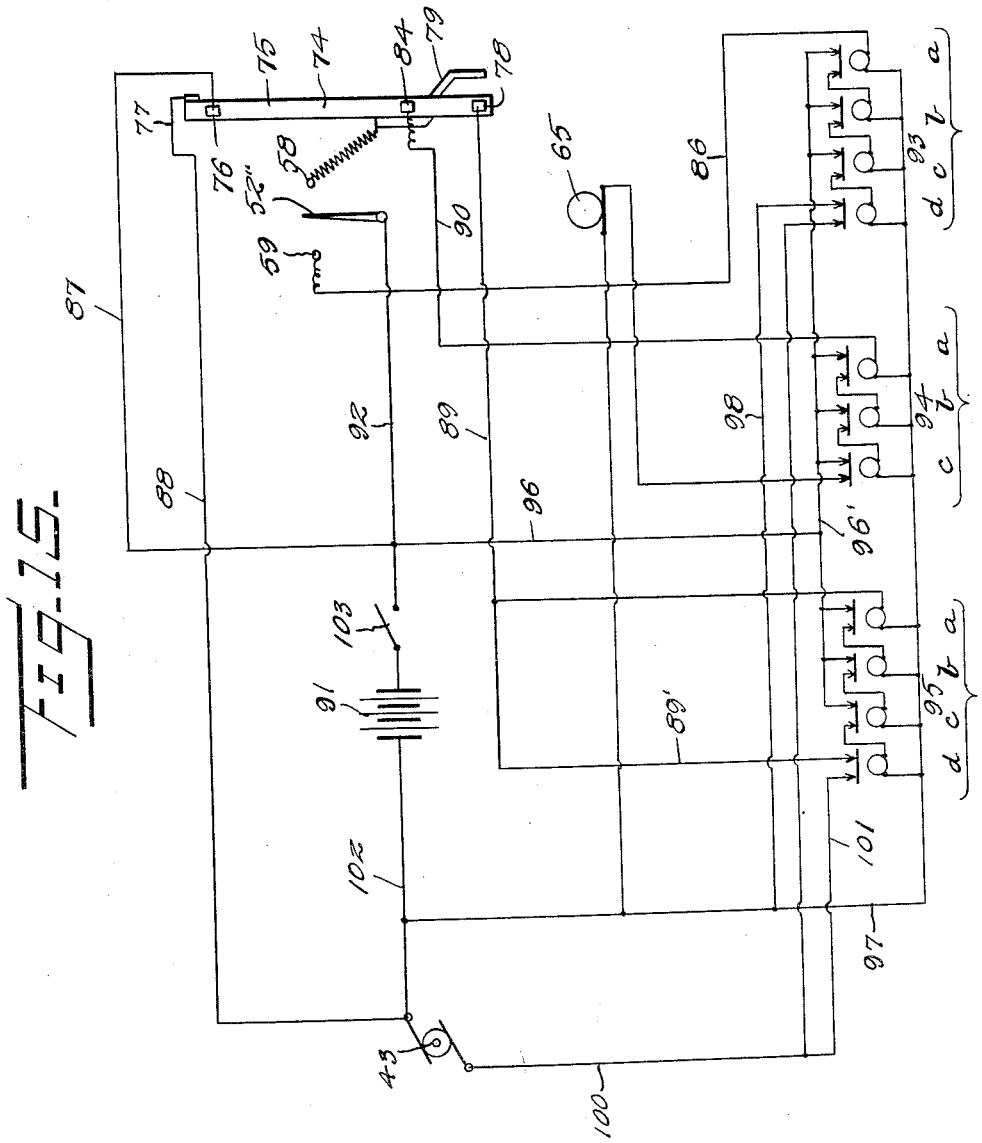

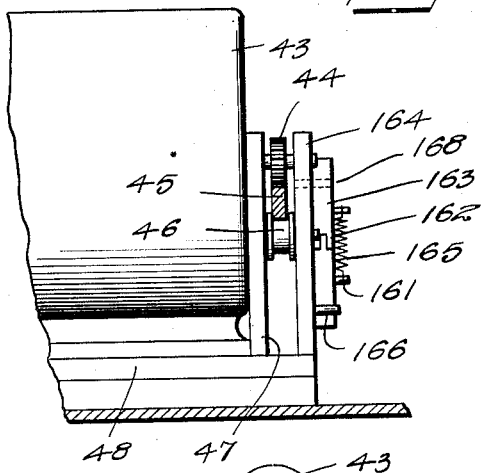
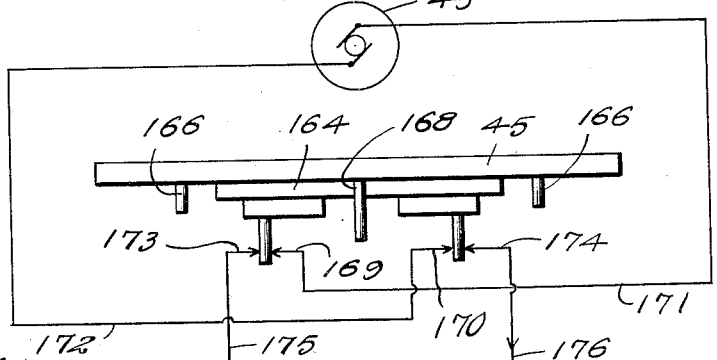
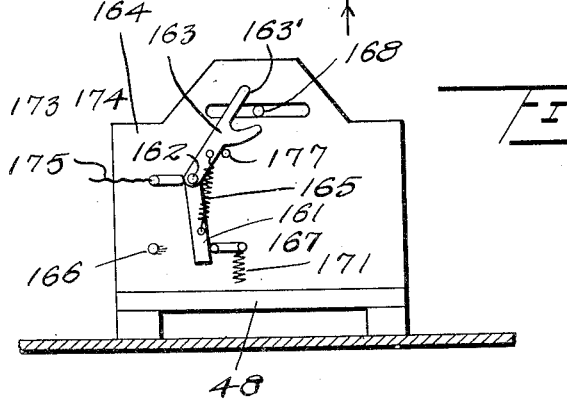

2,152,144

UNITED STATES PATENT OFFICE 2,152,144

AIRCRAFT

Giuseppe Minelli, Dawson, N. Mex.

Application July 2, 1937, Serial No. 151,728

5 Claims. (Cl. 244—76)

The invention relates to improvements in air craft generally and more particularly to a pilotless or robot flight control therefor.

An object of the invention is to provide means to be installed on aircraft, for instance, an airplane, which will effectively and efficiently function to control both horizontal and vertical avigation of the airplane, without human supervision, in a given direction and at an initially determined or given altitude.

Another object of the invention has to do with the provision of a flight control mechanism of the kind mentioned and which is comparatively simple and easy to adjust, both with regard to flight altitude and direction, and entirely automatic in operation to compensate for adverse flight conditions, maintaining the craft on its course until and after an objective is reached.

A further object of the invention resides in the provision of automatic control mechanism for the aileron, elevator and rudder controls of aircraft, and which are comparatively simple in construction, adjustment and operation, and capable of being installed on standard types of aircraft, without necessitating serious or undue changes in the usual construction and exterior and interior arrangements of such craft.

Yet another object of the invention is to provide independent electrically operated control mechanism for the elevator and rudder controls of the aircraft, including automatic circuit switching devices therefor, an altimeter controlled switch for the mechanism to automatically actuate the elevators, and a compass controlled switch for the mechanism to automatically actuate the rudder, the switching devices each adjustable to operate correspondingly with predetermined settings of the altimeter and compass to maintain the aircraft on its flight course.

Still another object of the invention has to do with the provisions of automatic gravity controls which cooperate with and aid in the functions of the automatic electrically operated control mechanisms for greater accuracy and precision in the setting of the craft controls for smooth and positive maneuvering of the craft to keep it on its course.

With these and other objects of equal importance in view, the invention resides in the certain new and useful combination, construction and arrangement of parts, circuits and instrumentalities as will be hereinafter more fully described, set forth in the appended claims, and illustrated in the accompanying drawings, in which:

Figure 1 is a top plan view, partly in section, of a conventional type of airplane equipped with the automatic con-devices and mechanisms, in accordance with the invention;

Figure 2 is a side elevation of the empennage or tail assembly of the airplane;

Figure 3 is an enlarged detail, in side elevation, of a gravity or pendulum control device for each of the ailerons;

Figure 4 is an enlarged front side elevation, partly in section, of the automatic altimeter controlled switching device for controlling the elevators;

Figure 5 is a vertical section taken on the line 5—5 of Figure 4;

Figure 6 is a horizontal section taken on the line 6—6 of Figure 4;

Figure 7 is a vertical section taken on the line 7—7 of Figure 5;

Figure 8 is a fragmentary vertical section taken on the line 8—8 of Figure 5;

Figure 9 is a side elevation, partly in section, of the automatic compass controlled switch device for controlling the rudder;

Figure 10 is a horizontal section taken on the line 10—10 of Figure 9;

Figure 11 is an enlarged, fragmentary, vertical section taken on the line 11—11 of Figure 1, and showing a part of the rudder control mechanism in side elevation;

Figure 12 is a detail, in front elevation, of the gravity or pendulum control device as shown in Figure 3;

Figure 13 is a side elevation, partly in section, of an automatic throttle control for the fuel supply to the engine;

Figure 14 is a horizontal section taken on the line 14—14 of Figure 13;

Figure 15 is a diagram of the electrical circuit connections for the altitude-elevator control mechanism;

Figure 16 is a diagram of the electrical circuit connections for the direction-rudder control mechanism;

Figure 17 is a vertical sectional view taken on line 17—17 of Figure 11;

Figure 18 is a front elevational view of the switch, and

Figure 19 is a diagrammatic view of a wiring arrangement for the elevator control mechanism.

Referring to the drawings, wherein like characters of reference denote corresponding parts throughout the several views, and more particularly to Figures 1, 2 and 11, the airplane shown is of a standard monoplane type and comprises generally a fuselage 21; wing panels or aerofoils 22 equipped with usual ailerons 23 at the tips of their trailing edges; and horizontal and vertical stabilizers 24 and 25 respectively provided with elevators 26 and a rudder 27 hinged to their trailing edges. A propeller 28 is driven from an engine 29 mounted within the nose of the fuselage. A usual fuel supply (not shown) and ignition system (also not shown) is provided for the operation of the engine 29.

In carrying out the objects and purposes of the instant invention, an automatic gravity control device is provided for each of the ailerons 23 and it is comprised in a weighted arm or pendulum 30 pivotally mounted, as at 31, on the leading edge of an aerofoil 22 in proximity to its outer end. The direction of swing of the pendulum 30 is parallel to the said leading edge, i. e., at right angles to the flight path of the craft. The upper pivoted end of the pendulum 30 is connected by a pair of wires 32, one wire end at a point above and an end of the other wire at a point below the pivot 31 and the opposite ends thereof respectively to the upper and lower sides of an aileron 23 substantially at its center; the points of connection of the wire ends to both the pendulum and the aileron being such that the wires are supported free from contact with the opposed surfaces of the aerofoil. From the points of connection with the aileron, the wires 32 extend forwardly above and below the aerofoil surfaces and pass angularly about grooved guide rollers 33 mounted on the upper and lower sides of the leading edge of the aerofoil and outwardly in slightly spaced relation to the latter to the points of connection with the pendulum 30. To equalize the tension on the wires 32 and compensate for variations therein as may be required from time to time, a turnbuckle 34 is spliced into each wire to that end. The two controls thus provided, while independent one of the other and normally functioning to hold the ailerons 23 at neutral, operate simultaneously to shift them as required to maintain the craft in balance or equilibrium at all times during flight.

Similarly, an automatic gravity control or joystick is provided for the elevators 26 and, as shown, it is comprised in a single weighted arm or pendulum 35 which depends through a slotted opening 36 in the bottom or floor of the fuselage 21. This opening 36 is disposed in the plane of the longitudinal center of the fuselage bottom or floor and at a point that approximates the usual position of the control stick of a pilot operated craft. The pendulum 35 is suspended through the opening 36 from a transverse pivot 37 secured in a frame-work 38 which functions as a reinforcement for the fuselage bottom or floor about the opening. In this instance, the direction of swing of the pendulum is in a plane parallel to the flight path and at right angles to that of each of the pendulums 30. Extending between points of connection with the upper pivoted end of the pendulum 35 and the elevators 26 are pairs of wires 39, one pair for control of the left elevator and the other of the right elevator. The wires of each pair have their forwardly directed ends commonly connected to the pendulum 35 at a point below the pivot 37 and each of their rearwardly directed ends to the usual horn on the lower side of an elevator, while the wires of the other pair have their forwardly directed ends similarly connected to the pendulum 35 at a point above the pivot 37 and each of their opposite ends to the horn on the upper side of an elevator. From the points of connection with the pendulum 35, each of the wires 39 connected to the lower sides of the elevators 26 pass outwardly of an opening 40 in a side wall of the fuselage 21 and over a grooved guide roller 41 mounted within the opening, while the other of the wires 39 pass from their points of connection with the pendulum 35 to the upper sides of the elevators 26 exteriorly of the fuselage 21 and over grooved guide rollers 41' mounted on the bottom of the latter in line with the rollers 41. Here also, turnbuckles 42 are spliced in the several wires 39 for equalizing the tension thereof. The pendulum 36 and the control wires 39 thus provided function to sustain the elevators 26 normally at neutral and to return them to such positions following each positive actuation thereof during vertical avigation.

For the desired pilotless operation of the craft in vertical and horizontal avigation, the elevators 26, in addition to the aforesaid gravity control, and the rudder 27, are to be electrically actuated automatically respectively by altimeter and compass control devices which are arranged for selective setting to predetermined altitude and direction of flight. These control devices and their related instrumentalities, including the circuit connections therefor, are housed within the fuselage 21 in a suitable manner, both with regard to accessibility and convenience for inspection and maintenance.

The actuating mechanism for the elevators 26 is comprised in an electric motor 43 having a gear 44 in mesh with a rack bar 45 supported for longitudinal movements on a pair of rollers 46 journalled in a bracket 47 rising from a base 48 on which the motor 43 is also mounted. This base 48 is secured in place on the bottom or floor of the fuselage 21 rearwardly of the pendulum 35 and in a position that one end of the rack bar 45 is conected by a pitman 49 to the pendulum 35, one end of the pitman being pivoted, as at 50, to the rack bar 45 and its other end, as at 51, to the extreme upper end of the pendulum. Reversed directional motion of the motor 43 will actuate the rack bar 47 to swing the pendulum 35 on its pivot 37 and thereby move the elevators 26 as may be required from time to time during craft flight. When the motor 43 comes to rest, the pendulum 35 immediately functions to return the elevators 26 to neutral, as before stated.

The operation of the motor 43 is automatically regulated from a switching device under the constant control of an altimeter 52 which is of standard construction but especially mounted for required cooperation with the switching device. As best shown in Figures 4 to 8, inclusive, the altimeter 52 is mounted within an annular frame 53 for angular adjustment therein, a set screw or the like 54 being provided to hold it in any selected set position. The frame 53 is supported on radial members 55 from one side of a vertical member or post 56 rising from a base 57 secured transversely within and upon the bottom or floor of the fuselage 21. The dial face 52' of the altimeter 52 is unenclosed for the cooperation of its index or pointer 52" with a fixed contact pin 58 and a movable contact pin 59. This movable contact pin 59 projects toward the dial face 52' from one end of an insulated member 60 slidably mounted in an opening 61 in the post 56. The member 60 has its other end pivoted, as at 62, to the upper end of an arm 63 which is pivoted toward its lower end, as at 64, to the side of the post opposite the side on which the altimeter frame 53 is supported. This arm 63 is actuated to move the pin contact 59 into and out of the path of the index or pointer 52" of the altimeter 43 as and when required by an electromagnet 65 mounted on the base 57, the armature 66 of the electromagnet being carried at the lower end of the arm 63 below its pivot. The arm 63 is normally positioned to withdraw the insulated slide member 60 partially outward of the opening 61 to remove the pin contact 59 from the path of the index or pointer 52". When these parts are actuated from the electromagnet 65, the slide member 60 is moved by the arm 63 inwardly of the opening 61 to place the pin contact 59 in the path of the index or pointer 52" at the side thereof opposite to that which is opposed by the fixed pin contact 58. To secure the parts in this latter position, an automatic lock means is provided to that end and it is comprised in a lock pin 67 which is mounted for horizontal sliding movements in the post 56 for engagement in a transverse opening 68 in the slide member 60 as required. The outer end of the lock pin 67 is provided with a knob 69 to facilitate its withdrawal for the release of the slide member 60 when necessary, and also with a coiled spring 70 arranged to snap the lock pin into locking position whenever the slide member is moved to place the opening 68 in line therewith.

As is best shown in Figure 6, the electromagnet 65 is preferably provided with a base plate 71 arranged for sliding adjustment on the post base 57. One end of the base plate 71 is projected outwardly of the electromagnet 65 and is formed with parallel longitudinal slots 72 engaged with securing bolts 73 rising from the post base 57. With nuts on the upper ends of the bolts 73 loosened, the plate 71 is moved relatively to the bolts to selectively position the electromagnet 65 relatively to the armature 66 and is thereafter secured in place by a tightening up of the nuts against the plate 71.

Pivoted, as at 74, to the side of the post 56 opposite the lock pin 67, is a switch arm 75 which has a contact member 76 at its end above the pivot 71 for cooperation with a fixed contact 77 mounted on the top of the post 56 and a second contact member 78 at its opposite end for cooperation with a contact member 79 projecting sidewise from the rear side of the post 56. This contact member 79 is in connection with the fixed contact pin 58 that is cooperative with the index or pointer 52" of the altimeter 52. The switch arm 75 is normally held in position, that the upper contact member 76 is engaged with the fixed contact 77 and the lower contact member 78 is disengaged from the side contact member 79, by means of a plunger 80 mounted for horizontal sliding movement in the top end of the post 56, one end of the plunger having bearing against the inner side of the switch arm 75 at a point above the pivot 74. The opposite end of the plunger 80 is provided with a knob 81 to facilitate its manipulation, and a coiled spring 82 interposed between the knob and the opposed side of the post 56 and arranged to tension the plunger toward and against the switch arm. Pivoted, as at 83, on the switch arm 72 below the pivot 71 is a contact member 84 which has a guide pin 85 projecting therefrom and engaged in an opening in the vertical member or post 56. This pin 85 is disposed in line with the lock pin 67 so as to be abutted by the opposed end of the latter when the lock pin 67 is moved into locking engagement with the transverse opening 68 in the slide member 60. Motion of the lock pin 67, under the tension of its spring 70, is transmitted to the pin 85 and the contact member 84, so that the switch arm 75 is swung on its pivot 74 breaking a circuit at the contacts 76 and 77 and closing a circuit at the contacts 78 and 79. From this, it will be obvious that the power of the spring 70 is greater than that of the spring 82, and as the switch arm 75 is swung on its pivot 74 by the motion of the lock pin 67, the plunger 80 is moved against the urge of the spring 82 to return the switch arm to normal position. Circuit connections 86, 87, 88, 89, and 90, lead from the contacts 59, 76, 77, 78 and 84, respectively for purposes which will be presently explained.

As shown in Figure 15, this switching device is connected in circuit with the electric motor 43 and a suitable current source 91, as follows: The index or pointer 52" of the altimeter 52 by a conductor 92 to the positive terminal of the current source 91. The fixed pin contact 58 direct to the contact 79 which is alternately cooperative with the contacts 78 and 84 on the switch arm 75. The contact 76 by connection 87 to the positive side of the current source 91. The contact 77 by connection 88 to one terminal of the motor 43. The movable contact pin 59 by connection 86 to the first of a bank of relays 93, preferably four in number and separately designated 93a, 93b, 93c, 93d, respectively. The fixed contact pin 58 through the contact 84 and connection 90 to the first of a second bank of relays 94, preferably three in number and separately designated 94a, 94b, and 94c, respectively. The contact 78 by connection 89 to the first of a third bank of relays 95, preferably four in number and separately designated 95a, 95b, 95c, and 95d, respectively. A conductor 96 leads from the positive side of the current source 91 and is commonly connected by a branch conductor 96' to one contact each of the relays 93a, 93b, and 93c, in the bank of relays 93, relays 94a, 94b, and 94c, in the bank of relays 94, and relays 95a, 95b, and 95c, of the bank of relays 95. The connections 86, 89, and 90, connect one side of the coils of the relays 93a, 94a, and 95a, respectively, and the corresponding sides of the coils of the relays 93b, 93c, 93d, 94b, 94c, 95b, 95c, and 95d, are connected to the other of the contacts of the relays in their respective banks 93, 94 and 95, while the other sides of the coils of all of the relays are connected to a common return conductor 97 to the negative side of the current source 91. One contact of the relays 93d is connected by conductor 98 to the negative return conductor 97 and its other contact by a conductor 99 to a lead 100 from the other terminal of the motor 43. The lower contact 78, on the switch arm 75, by way of conductor 89 is also connected by a conductor 89' to one contact of the relay 95d which has its other contact connected by a conductor 101 to the lead 100 from the motor 43. A lead 102 connects the first named terminal of the motor 43 to the negative side of the current source 91. A main current control switch 103 may be provided in the conductor 92, substantially as shown.

From these connections and circuits, it will be evident that the switch arm 75 and the several associated contacts functions to reverse the operative motion of the motor 43 correspondingly with opposite motions or fluctuations of the index 52" of the altimeter 52 between the contact pins 58 and 59, and that the operation of the switch arm 75 is controlled by the electromagnet 65. A plurality of relays are employed in each of the banks or groups 93, 94 and 95, in order to allow for a time interval delay between the operative movements of the switch arm 75, the electric motor 43 and the electromagnet 65, so that the elevators 26 will function efficiently and smoothly as required and the craft will not be subject to erratic and violent changes in the vertical avigation thereof.

In the operation of this elevator control mechanism, the altimeter 52 is adjusted in the frame 53 by loosening up on the set screw 54 and turned to bring a predetermined graduation on the dial 52' in registry with the fixed contact pin 58. This setting is selected as representative of the maximum altitude that the air craft is to attain on a given flight. With the altimeter so adjusted, the parts of the switch device are initially positioned, as shown in Figures 4, 5 and 6 for the take-off of the craft.

The actuating mechanism for the control of horizontal navigation of the craft during flight from the rudder 27 is, as shown in Figures 1, 8, 10 and 16, comprised in a rudder bar 104 which is centrally pivoted, as at 105, on a transverse reinforcement 106 on the floor of and toward the tail end of the fuselage 21. The rudder 27 is sustained at normal flying position by opposed springs 104' which are each connected at one end to the fuselage 21 and at the other end to the rudder bar 104 to one side of the pivot 105. The opposite ends of the bar 104 are connected by wires 107, extending rearwardly outward of the fuselage, to corresponding sides of the rudder 27. A pitman 108 extends forwardly from a pivot connection 109 at one end of the bar 104 and has its other end connected, as at 110, to the adjacent end of a rack bar 111. The rack bar 111 extends forwardly from and in line with the pitman 108 and is supported for reciprocating motion on guide rollers 112 journaled in a bracket 113 rising from the base of an electric motor 114. A gear 115 on the shaft of the motor 114 is arranged in mesh with the teeth of the rack bar 111 for imparting reversed reciprocating motions thereto, as required, the motor being secured in proper position on the floor of the fuselage 21, after the manner as shown in Figure 1.

A compass control is provided for the motor 114, and, as best shown in Figures 9 and 10, it is comprised in a support 116 which is suspended in the plane of the longitudinal center of the craft from a bracket 117 secured on the ceiling of the interior of the fuselage 21 forwardly of the motor 114. The suspension means for the support 116 consists of an upper member 118 which is attached at its upper end to the bracket 117 by a longitudinal pivot 119 and at its opposite end to a lower member 120 by a transverse pivot 121. The lower end of the member 120 is separately pivoted, as at 122, to the upper ends of a plurality of arms 123 which are equidistantly spaced about the member 120 and pivoted at their lower ends, as at 124, to uprights 125 issuing from the side edges of the support 116.

A compass casing 126 is positioned upon the support 116 between the uprights 125 and has a removable clamp ring 127 for a dial 128 supported horizontally within the casing 126. Mounted in the dial 128 adjacent its edge and rising therefrom is a pair of speed contact pins 129 and 130 for cooperation with an end of the needle 131, the latter having its center pivot provided with an electrical connection 132 and the contact pins with electrical connections 133 and 134 respectively.

As shown in Figure 16, the compass switching device is connected in circuit with the electric motor 114 and the current source 91', as follows: The connection 132 from the pivot of the compass needle 131 to the positive terminal of the current source 91'. The contact pin 129 by a conductor 133 to the coil of the first of a bank of relays 135, preferably four in number and designated 135a, 135b, 135c, and 135d. The contact pin 130 by a conductor 134 to the coil of the first of a second bank of relays 136, also and preferably four in number and designated 136a, 136b, 136c, and 136d. The other sides of these two coils of the relays 135a and 136a are commonly connected to a return conductor 137 to the negative terminal of the current source 91'. A conductor 138 leads from the positive terminal of the current source 91' and connects branch conductor 139 and 140. The branch conductor 139 connects one of a pair of switch contacts of the relay 135a and the branch conductor 140 the corresponding contact of the switch of the relay 136a. From the switch contact of the relay 135a, the branch conductor 139 extends to and connects one each of the pairs of switch contacts of the relays 135b and 135c. Similarly, the branch conductor 140 leads to and connects one each of the pairs of switch contacts of the relays 135a and 135b are connected respectively to one side of each of the coils of the relays 135b and 135c. Likewise, the corresponding switch contacts of the relays 136a and 136b are connected respectively to one side of the coils of the relays 136b and 136c. The opposite sides of the coils of the relays 135b and 136b are commonly connected to the return conductor 137 leading to the current source 91'. The opposite sides of the coils of the relays 135c and 135d are, in turn, commonly connected to the return conductor 137 by a conductor 141, and the same sides of the coils of the relays 136c and 136d to the return conductor 137 by a conductor 142. The remaining contact of the relay 135c is connected to one terminal of the electric motor 114 by a conductor 143 and the same contact of the relay 136c to the other terminal of the motor 114 by a conductor 144. One of the pair of switch contacts of the relay 135d is connected by a conductor 145 to the terminal of the motor 114 that was previously connected by the conductor 144, and the corresponding contact of the relay 136d is connected by a conductor 146 to the terminal of the motor 114 previously connected by the conductor 143. The remaining switch contact of the relay 135d is connected by a conductor 147 to one side of the coil of the relay 135d and to the return conductor 137 by way of the conductor 141. Likewise, the remaining switch contact of the relay 136d is connected by a conductor 148 to one side of the coil of this relay and to the return conductor 137 by way of the conductor 142.

Referring now to Figures 1, 13 and 14, an automatic gravity control for the throttle of the fuel intake 149 to the engine 29 is depicted and it is comprised in a weighted arm or pendulum 150 which is mounted on a transverse pivot 151 carried in a bracket 152 secured in a convenient position at one side of the fuselage 21. The upper end of the pendulum 150 is pivoted, as at 153, to a pitman 154, which has its other end pivoted, as at 155, to operating arm 156 of the fuel intake 145. Rising from the top side of the bracket 152 is an upright 157 in which a lock pin 158 is transversely slidable into and out of the path of the upper end of the pendulum 150. The lock pin 158 is headed, as at 159, at one end and has a coiled spring 160 on its headed end and arranged to tension the pin in place on the bracket 152. The arm 150 swings in the plane of the flight path and when pendant in the vertical holds the throttle at engine speed for craft take-off and climb. The lock pin 58 functions as a stop to prevent rearward swing of the pendulum 150, but the latter is free for forward swing to increase the opening of the throttle whenever the craft tends to nose downward during flight.

In the operation of an airplane equipped with the automatic controls in accordance with the invention, the craft will be moved to desired position for take-off and sustained against forward movement, until the engine 29 is idled for warming and its lubricating oil is properly circulating, and the altimeter and compass controlled switching devices and the pendulum throttle control are set to selected positions of predetermined altitude, direction, and speed of flight. When these preliminaries are completed, the sustaining means will be released and the craft will get under weigh for take-off in the set direction of its course of flight. As the craft moves forward for takeoff and begins to nose upward on its climb for altitude, the angular relation of the fuselage 21 and the pendulum 35 changes and the motion resulting therefrom is transmitted through the wires 39 to the elevators 26 which, in this instance, are gradually tilted in a downward direction to normal horizontal flight position as the altitude for which the altimeter 52 is set is being attained. As maximum altitude is approached and before stalling moment is reached, the index or pointer 52" moves toward and against the fixed contact pin 58 and completes the circuit between the current source 91 and the electromagnet 65 through the relay bank 94. During the approach to maximum altitude, the lift of the craft decreases and it begins to nose over the levelling off, with the result of a gradual change in a reverse direction of the angular relation between the fuselage 21 and the pendulous joystick 35 and return of the elevators 26 to normal positions. At maximum altitude, the control of the elevators 26, to maintain average straight-away flight, is automatically taken over by the altimeter 52, as is obvious. Having reached maximum altitude, the craft, being otherwise properly rigged in accordance with known principles of aircraft construction and design, will be in balance and equilibrium and will continue on level flight without control functions until effective forces act to create a change in altitude.

When the circuit is closed at the fixed contact 58, current from the source 91 is impressed on the motor 43 to cause its rotation in a direction that the rack-bar 45 will actuate the pendulous joystick 35 in direction to pull on the wires 39 to return the elevators 26 to normal. Similarly, closing of the circuit at the movable contact 59 will effect a reversal in current flow through the motor 43 and thereby reverse the direction of motion of the latter, with the result that the direction of motion of the rack-bar 45 and the joystick 35 is likewise reversed for actuating the elevators 26 to return them from opposite positions to normal. As before stated, the relays 93, 94, and 95, in circuit with the altimeter switching device and the motor 43 function to retard any undue and sudden angular motions of the elevators.

Upon the energizing of the electromagnet 65, it will attract an armature 66 and thereby cause it to move the slide member 60 in a direction to place the movable contact pin 59 in the path of the altimeter index 52" at the side thereof opposite to that opposed to the fixed contact pin 58. As the slide member 60 moves as stated, the transverse opening therein will line up with the lock plunger 67 and be engaged thereby through the action of the spring 70, in which position the parts remain until the normal flight of the craft is terminated. As the plunger 67 engages the opening 68 to lock the slide member 60, it pushes against the guide pin 85 of the contact member 84 and swings the switch arm 75 on its pivot 74 into the other position of its operation. As the upper end of the switch arm 75 swings to its new position, the plunger 80, which normally holds the arm in its initially set position, is depressed and places the spring 82 under tension that will be available to facilitate the return of the arm to initially set position when the lock pin 67 is withdrawn to release the slide member 60 for the removal of the movable contact pin 59 again from the path of the index or pointer 52" of the altimeter 52. In this position of the control switch parts, the craft will be set on its normal straightaway flight path and will continue so until adverse air conditions are met up with. The balance or equilibrium of the craft will be automatically maintained by the pendulum controls 30 of the ailerons 23.

In the event that the craft starts to lose altitude, the retrograde movement of the index or pointer 52" of the altimeter 52 coincident therewith will finally result in its abutting the movable contact pin 59, when a circuit will be established between the motor 43 and the current source 91 through the back of relays 93. Here, the motion of the motor 43 through the gear 44 moves the rack bar 45 to swing the pendulum 35 on its pivot 37 in a direction to again tilt the elevators in an upward direction to cause the nose of the craft to lift and bring the craft on its course at proper altitude. However, if the craft tended to climb above predetermined altitude, the index or pointer 52" of the altimeter 52, will again move against the fixed contact pin 58, when the motor 43 will be connected to the current source 91 through the bank of relays 95 and the rack bar 45 will be moved by the motor gear 44 in a direction opposite to that as in the first instance, thus causing movement of the pendulum 35 to tilt the elevators 26 in a downward direction to depress the nose of the craft.

Similarly, in the event that the craft tends to move off its predetermined flight path, the needle 131 of the compass controlled switch device will move against one or the other of the contact pins 129 and 130 and connect the motor 114 to the current source 91'. If the needle 131 abuts the contact pin 129 a circuit will be completed through the bank of relays 136 to cause the motor 114, through its gear 115, to move the rack bar 111 in one direction for the actuation of the rudder 27 in proper direction to bring the craft back on its set course. However, should the needle 131 abut the contact pin 130, a circuit will be completed through the bank of relays 138 to cause the motor 114, through its gear 115 to move the rack bar 111 in a reversed direction for the actuation of the rudder in the opposite direction.

As a protective means to the elevator control mechanism, an independent control means is provided for the motor 43 and it is cooperative with the rack bar 45 to effect a stoppage of the motor 43 at the end of each reversed movement of reciprocation of the rack bar. This control means is in the form of a pair of switch blades 161 each commonly pivoted, as at 162, with an actuating arm 163 to a bracket plate 164 rising from the motor base 48 in front of the rack bar mechanism on the motor bracket 47. A switch blade 161 and an arm 163 are interconnected by a spring 165 to impart a snap action to the switch blade between spaced stop pins 166, 167, projecting from the bracket plate 164. The free end of the arm at 163 is forked, as at 163', for engagement with a projection 168 on the front side of the rack bar 145 in the reversed directional motions of the latter, the bracket plate 164 being slotted to permit movement of the projection 168 therein for cooperation with the actuating arms 163. The stop pins 167, at the inner side of each switch blade 161, are parts of circuit terminal contacts 169, 170, which are to be connected, the contact 169 with one terminal of the motor 43 by a lead 171, and the contact 170 to the other terminal of the motor 43 by a lead 172. Similarly, the pivots 162 are parts of circuit contacts 173, 174, at the outer sides of the switch blades 161, and these contacts are connected by leads 175, 176, respectively, to the positive and negative sides of the current source.

With both switch blades 161 set to close the circuit on the motor at the contacts 169, 170, the forks 163' of the actuating arms 163 will be positioned against stop pins 177 and in the patch of the projection 168 on the rack bar 45, so that motion of the latter in either of its reversed directions of movement will cause the projection 168 to engage the longer finger of a fork 163' and move the arm 163 with it until the tension on a spring 165 acts to snap a switch blade 161 away from either of the contacts 169, 170, depending upon the direction of movement of the rack bar 45. The circuit thus broken is to be restored manually by moving the actuating arm 163 to normal operative position, when the switch blade 161 will be snapped back into circuit closing position by the spring 165.

This pilotless or robot-controlled aircraft is primarily intended for military purposes and may be provided with usual manual controls (not shown) if desired. In any case, it is to be substantially constructed to fully meet all war-time conditions and requirements and, in the absence of manual controls, it may be built without regard to interior finish and human accommodations and conveniences, in order to minimize cost of manufacture. No provision has been disclosed herein for grounding the craft once it is in flight, since it may be self-destroying upon reaching an objective, as by crashing upon exhausting of its motor fuel supply or being blown to pieces or burned if provided with a suitable timed explosive or inflammable charge (not shown). However, and if desired, the craft may be captured during flight and for subsequent grounding by the transfer to it, in any usual manner, of a pilot from a regularly piloted airplane or other aircraft. To enhance the value of the proposed craft for military purposes, it may be provided with any suitable bomb carrying and discharge means (not shown) whereby the bombs may be dropped upon an objective within a predetermined radius of flight of the craft, which radius may be predetermined by a measured fuel supply up to maximum capacity.

Without further description, it is thought that the features and advantages of the invention will be readily apparent to those skilled in the art, and it will of course be understood that changes in form, proportion and minor details of construction may be resorted to, without departing from the spirit of the invention or its scope as claimed.

Having thus fully described my invention, what I claim is:

1. In an automatic flight control for air craft, an electrical mechanism for actuating each of the elevator and rudder controls for vertical and horizontal avigation respectively of the craft, an automatic switch means for controlling the operation of each electrical means one independently of the other to maintain the craft at a given altitude and direction, and means for preventing the operation of the switch means for the actuation of the electrical mechanism for the elevator controls until the craft has reached a predetermined altitude.

2. The flight control as set forth in claim 1, wherein an electromagnet means is provided to automatically release the said switch means for controlling the operation of the elevator controls when the craft has reached the predetermined altitude.

3. The flight control as set forth in claim 1, wherein an altimeter is provided to control the operation of the said switch means and certain of the contacts of the switch means are cooperative with the altimeter index for controlling the circuits of the electrical mechanism for the automatic actuation of the elevator controls correspondingly with fluctuations of the index, and the altimeter has means for its adjustment relatively to the contacts to cause the index to cooperate therewith at a selected altitude.

4. The flight control as set forth in claim 1, wherein a lock means is provided to hold the said switch means normally inactive with respect to the operation of the elevator controls by its electrical mechanism during the take-off and climb of the craft for altitude, and means for automatically releasing the lock means to place the switch means in its operative condition immediately following the arrival of the craft at predetermined ceiling altitude.

5. The flight control as set forth in claim 1, with the automatic switch means provided with a frame for adjustably supporting an altimeter, a fixed contact on the dial of the altimeter for cooperation with the movable altimeter index, a movable contact to be brought into cooperative relation with the fixed contact and the index after a selective setting of the altimeter within the frame, lock means normally holding the movable contact out of such cooperative relation, and means for automatically releasing said lock means upon initial contact of the index with the fixed contact at the moment of maximum flight altitude of the craft.

GIUSEPPE MINELLI.